United States Patent
Tsai

(10) Patent No.: US 12,220,799 B2
(45) Date of Patent: Feb. 11, 2025

(54) POWER CONTROL CIRCUIT AND ELECTRIC-POWERED NAILING GUN APPARATUS

(71) Applicant: BASSO INDUSTRY CORP., Taichung (TW)

(72) Inventor: Cheng-En Tsai, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 30 days.

(21) Appl. No.: 18/450,230

(22) Filed: Aug. 15, 2023

(65) Prior Publication Data
US 2024/0066673 A1   Feb. 29, 2024

(30) Foreign Application Priority Data

Aug. 30, 2022   (TW) .................................. 111132765

(51) Int. Cl.
| | |
|---|---|
| B25C 1/06 | (2006.01) |
| B25C 1/00 | (2006.01) |
| H02J 7/00 | (2006.01) |
| H02J 7/34 | (2006.01) |

(52) U.S. Cl.
CPC ................ *B25C 1/06* (2013.01); *B25C 1/008* (2013.01); *H02J 7/0029* (2013.01); *H02J 7/345* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 7,546,057 B2 * | 6/2009 | Muraishi ............... | H02J 7/0016 399/88 |
| 2021/0031349 A1 * | 2/2021 | Fan ....................... | H02J 7/0069 |

* cited by examiner

*Primary Examiner* — Tanzim Imam
(74) *Attorney, Agent, or Firm* — Muncy, Geissler, Olds & Lowe, P.C.

(57) ABSTRACT

A power control circuit includes a non-locked power switch, a capacitor, a power connection unit, a power converter and a self-hold control unit. When the non-locked power switch is grounded and the capacitor is fully charged and the self-hold control unit is controlled to be turned off, the capacitor stops being charged by a power supply apparatus through the power connection unit and the power control circuit enters a sleep mode.

12 Claims, 5 Drawing Sheets

POWER CONTROL CIRCUIT AND ELECTRIC-POWERED NAILING GUN APPARATUS

BACKGROUND OF THE DISCLOSURE

Technical Field

The present disclosure relates to a control circuit and a nailing gun apparatus, and especially relates to a power control circuit and an electric-powered nailing gun apparatus.

Description of Related Art

A related art power control circuit is applied to an electronic apparatus to control a power inputted to the electronic apparatus, and the related art power control circuit includes a non-locked power switch. Here, the non-locked power switch refers to a switch that: when a user's hand presses the switch, the switch will be short-circuited and turned on; but when the user's hand leaves the switch, the switch will pop up and be turned off. The working principle of the related art power control circuit is that the user presses the non-locked power switch, so that the non-locked power switch is grounded to turn on a specific circuit of the related art power control circuit, so that the related art power control circuit receives the power. Then, the related art power control circuit continuously receives the external power to supply power to the electronic apparatus through a self-hold control circuit. Finally, after the related art power control circuit can self-hold control to continuously receive the external power to supply power to the electronic apparatus, the user's hand can leave the non-locked power switch, and the non-locked power switch pops up and is turned off and is no longer grounded. When the related art power control circuit is not used for more than a predetermined time, the self-hold control circuit will be turned off so that the related art power control circuit stops receiving the external power, so as to save energy.

However, the non-locked power switch of the related art power control circuit is easy to be damaged under the long-term use, resulting in the abnormal jamming or failure after being pressed. When the related art power control circuit is not used for more than the predetermined time, even if the self-hold control circuit will be turned off, but because the non-locked power switch is still grounded due to the abnormal jamming or failure, the above-mentioned specific circuit is still turned on, so that the related art power control circuit still receives the power and cannot sleep and thus wastes power.

Furthermore, the activation mechanism of a related art electric-powered nailing gun apparatus is designed as follows: first, the user presses a non-locked power switch on the related art electric-powered nailing gun apparatus, so that the non-locked power switch is grounded to turn on a specific circuit, so that the related art electric-powered nailing gun apparatus receives a power from a battery; then, the related art electric-powered nailing gun apparatus receives the power from the battery continuously through the self-hold control circuit; finally, after the related art electric-powered nailing gun apparatus can self-hold control to continuously receive the power from the battery, the user's hand can leave the non-locked power switch, and the non-locked power switch will pop up and be turned off and be no longer grounded. When the related art electric-powered nailing gun apparatus is not used for more than a predetermined time, the self-hold control circuit will be turned off so that the related art electric-powered nailing gun apparatus stops receiving the external power, thereby saving energy.

However, the non-locked power switch of the related art electric-powered nailing gun apparatus is easy to be damaged under the long-term use, resulting in the abnormal jamming or failure after being pressed. When the related art electric-powered nailing gun apparatus is not used for more than the predetermined time, even if the self-hold control circuit will be turned off, but because the non-locked power switch is still grounded due to the abnormal jamming or failure, the above-mentioned specific circuit is still turned on, so that the related art electric-powered nailing gun apparatus still receives power and cannot sleep and thus wastes power; finally, the battery of the related art electric-powered nailing gun apparatus will be damaged.

SUMMARY OF THE DISCLOSURE

In order to solve the above-mentioned problems, an object of the present disclosure is to provide a power control circuit.

In order to solve the above-mentioned problems, another object of the present disclosure is to provide an electric-powered nailing gun apparatus.

In order to achieve the object of the present disclosure mentioned above, the power control circuit of the present disclosure is applied to a power supply apparatus. The power control circuit includes a non-locked power switch, a capacitor, a power connection unit, a power converter and a self-hold control unit. The capacitor is electrically connected to the non-locked power switch. The power connection unit is electrically connected to the capacitor. The power converter is electrically connected to the power connection unit. The self-hold control unit is electrically connected to the power converter and the power connection unit. Moreover, when the non-locked power switch is grounded and the capacitor is fully charged and the self-hold control unit is controlled to be turned off, the capacitor is configured to stop being charged by the power supply apparatus through the power connection unit and the power control circuit is configured to enter a sleep mode.

In order to achieve another object of the present disclosure mentioned above, the electric-powered nailing gun apparatus of the present disclosure is applied to a power supply apparatus. The electric-powered nailing gun apparatus includes a non-locked power switch, a capacitor, a power connection unit, a power converter, a self-hold control unit and an electric-powered nailing gun circuit. The capacitor is electrically connected to the non-locked power switch. The power connection unit is electrically connected to the capacitor. The power converter is electrically connected to the power connection unit. The self-hold control unit is electrically connected to the power converter and the power connection unit. The electric-powered nailing gun circuit is electrically connected to the power converter. Moreover, when the non-locked power switch is grounded and the capacitor is fully charged and the self-hold control unit is controlled to be turned off, the capacitor is configured to stop being charged by the power supply apparatus through the power connection unit and the electric-powered nailing gun apparatus is configured to enter a sleep mode.

The advantage of the present disclosure is to prevent the power control circuit or the electric-powered nailing gun apparatus from being unable to sleep due to the continuous grounding of the non-locked power switch (for example, the abnormal jamming or failure) and wasting power.

Please refer to the detailed descriptions and figures of the present disclosure mentioned below for further understanding the art, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

BRIEF DESCRIPTION OF THE DRAWINGS

FIG. 3-1 shows a block diagram of the first embodiment of the electric-powered nailing gun circuit of FIG. 2 of the present disclosure.

FIG. 3-2 shows a block diagram of the second embodiment of the electric-powered nailing gun circuit of FIG. 2 of the present disclosure.

DETAILED DESCRIPTION

Figure 1:
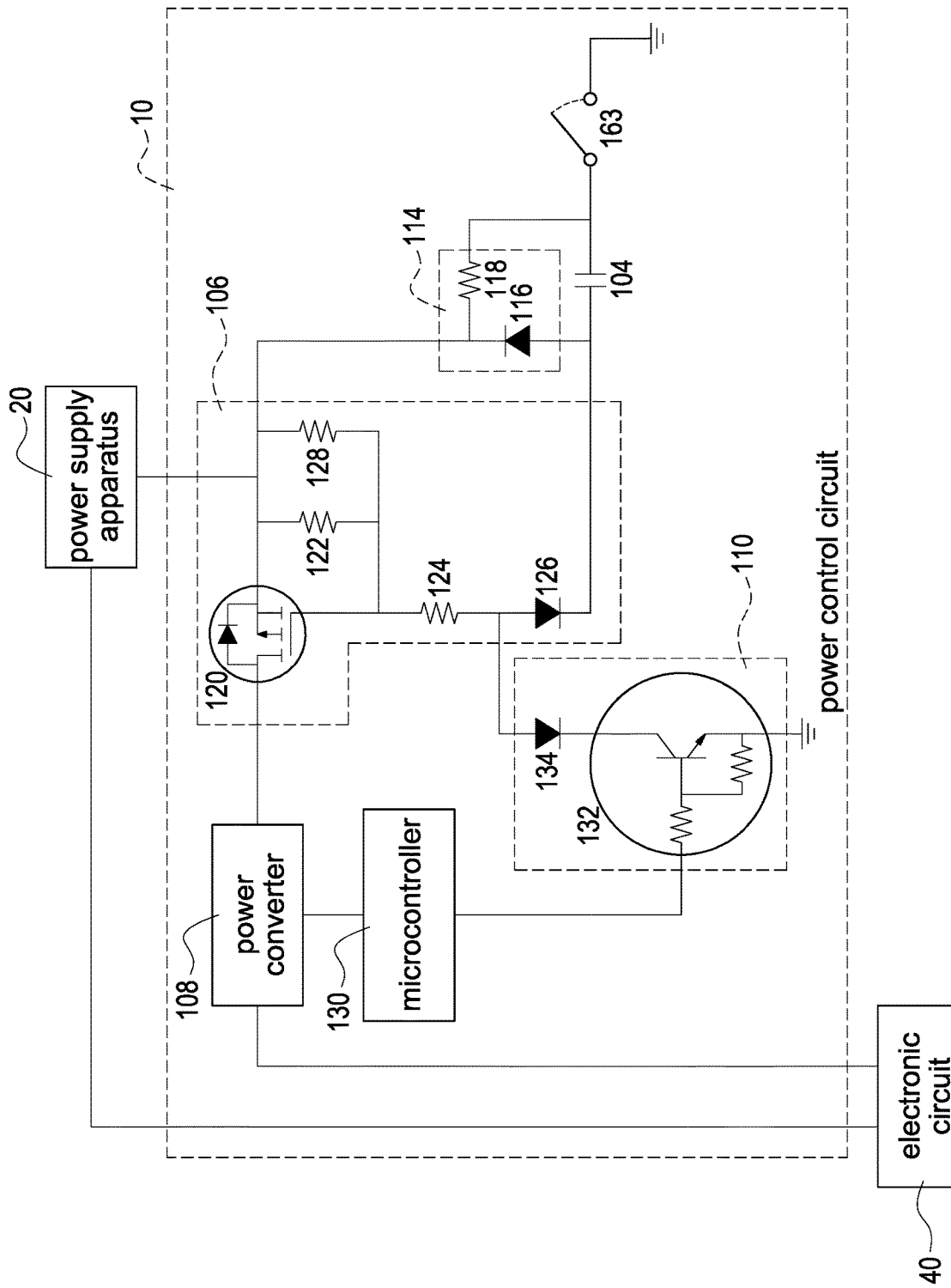
FIG. 1 shows a circuit block diagram of the power control circuit of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a circuit block diagram of the power control circuit 10 of the present disclosure. A power control circuit 10 of the present disclosure is applied to a power supply apparatus 20 (for example, a battery) and an electronic circuit 40 (for example, an electric-powered nailing gun circuit). The power control circuit 10 includes a non-locked power switch 163, a capacitor 104, a power connection unit 106, a power converter 108, a self-hold control unit 110, a discharging unit 114 and a microcontroller 130. The power connection unit 106 includes a connection-side transistor switch 120, a connection-side first resistor 122, a connection-side second resistor 124, a connection-side diode 126 and a connection-side third resistor 128. The self-hold control unit 110 includes a control-side transistor switch 132 and a control-side diode 134. The discharging unit 114 includes a discharging-side diode 116 and a discharging-side resistor 118. The aforementioned elements are electrically connected to each other. In the present disclosure, the non-locked power switch 163 refers to a switch that: when a user's hand presses the non-locked power switch 163, the non-locked power switch 163 will be short-circuited and turned on; but when the user's hand leaves the non-locked power switch 163, the non-locked power switch 163 will pop up and be turned off.

Moreover, when the non-locked power switch 163 is grounded and the capacitor 104 is not fully charged, the capacitor 104 is charged by the power supply apparatus 20 through the power connection unit 106, and the power converter 108 is powered by the power supply apparatus 20 through the power connection unit 106, so that the power converter 108 drives the self-hold control unit 110 to be turned on. When the self-hold control unit 110 is turned on, the power converter 108 is powered by the power supply apparatus 20 through the power connection unit 106. In the present disclosure, the non-locked power switch 163 being grounded means that the non-locked power switch 163 is pressed or abnormally stuck or faulty, so that the non-locked power switch 163 is grounded.

More specifically, the connection-side first resistor 122 and the connection-side third resistor 128 are configured to form a parallel resistor circuit. The parallel resistor circuit, the connection-side second resistor 124 and the connection-side diode 126 are configured to form a capacitor charging path. The parallel resistor circuit, the connection-side second resistor 124, the control-side diode 134 and the control-side transistor switch 132 are configured to form a power-receiving starting path. By properly designing the values/specifications of the above-mentioned elements shown in FIG. 1, when the non-locked power switch 163 is grounded and the capacitor 104 is not yet fully charged, the capacitor 104 is charged by the power supply apparatus 20 through the capacitor charging path, and simultaneously the connection-side transistor switch 120 is turned on by a voltage difference of the parallel resistor circuit, so that the power converter 108 is powered by the power supply apparatus 20 through the connection-side transistor switch 120 to drive the power converter 108, so that the power converter 108 turns on the control-side transistor switch 132 through the microcontroller 130 (for example, the microcontroller 130 sends a high signal to the control-side transistor switch 132 to turn on the control-side transistor switch 132).

Continuing with the above, when the control-side transistor switch 132 is turned on, the power-receiving starting path is turned on, and the connection-side transistor switch 120 is turned on by the voltage difference of the parallel resistor circuit, so that the power converter 108 is powered by the power supply apparatus 20 through the connection-side transistor switch 120, so that the power converter 108 supplies power to the electronic circuit 40 to drive the electronic circuit 40, and the power converter 108 still continues to turn on the control-side transistor switch 132 through the microcontroller 130, so as to continuously turn on the connection-side transistor switch 120 so that the power converter 108 continues to be powered by the power supply apparatus 20 through the connection-side transistor switch 120.

Continuing with the above, at this time, since the non-locked power switch 163 is grounded for a long enough time (for example, the non-locked power switch 163 is pressed long enough), the capacitor 104 is fully charged, so that the capacitor 104 stops being charged by the power supply apparatus 20 through the capacitor charging path; at this time, if the non-locked power switch 163 stops being pressed, namely, when the non-locked power switch 163 stops being grounded, the capacitor 104 will discharge through the discharging-side diode 116 and the discharging-side resistor 118.

Continuing with the above, when the power control circuit 10 or the electronic circuit 40 is not used for more than a predetermined time (for example, 5 minutes), the power control circuit 10 or the electronic circuit 40 intends to enter a sleep mode to save power, so that the power converter 108 turns off the control-side transistor switch 132 through the microcontroller 130 (for example, the microcontroller 130 sends a low signal to the control-side transistor switch 132 to turn off the control-side transistor switch 132) to turn off the power-receiving starting path, so that the connection-side transistor switch 120 is turned off and the power converter 108 stops being powered by the power supply apparatus 20 through the connection-side transistor switch 120, so as to save energy; it should be noted that at this time the non-locked power switch 163 stops being pressed, so the connection-side transistor switch 120 cannot be turned on by the voltage difference of the parallel resistor circuit of the capacitor charging path.

When the non-locked power switch 163 is grounded and the capacitor 104 is fully charged and the self-hold control unit 110 is controlled to be turned off, the capacitor 104 stops being charged by the power supply apparatus 20 through the power connection unit 106 and the power control circuit 10 enters the sleep mode.

In more detail, even if the non-locked power switch 163 is continuously grounded due to being pressed or abnormally stuck or faulty, the capacitor 104 will turn off the capacitor charging path because the capacitor 104 is fully charged; the connection-side transistor switch 120 cannot be turned on by the voltage difference of the parallel resistor circuit of the capacitor charging path; at this time, if the power control circuit 10 or the electronic circuit 40 intends to enter the sleep mode, the control-side transistor switch 132 of the self-hold control unit 110 will be controlled to be turned off, so that the connection-side transistor switch 120 cannot be turned on by the voltage difference of the parallel resistor circuit of the power-receiving starting path, so the power control circuit 10 or the electronic circuit 40 can successfully enter the sleep mode to save energy.

However, a related art power control circuit does not have the capacitor 104 at least, so if the non-locked power switch 163 is pressed or abnormally stuck or faulty and continuously grounded, the capacitor charging path will be continuously turned on; at this time, if the power control circuit 10 or the electronic circuit 40 intends to enter the sleep mode, even if the control-side transistor switch 132 of the self-hold control unit 110 is controlled to be turned off and thus the connection-side transistor switch 120 cannot be turned on by the voltage difference of the parallel resistor circuit of the power-receiving starting path, the connection-side transistor switch 120 can be turned on by the voltage difference of the parallel resistor circuit of the capacitor charging path, so the power control circuit 10 or the electronic circuit 40 or the power converter 108 will continue to be powered by the power supply apparatus 20 through the connection-side transistor switch 120 to waste power.

Furthermore, please refer to FIG. 1 again. One end of the non-locked power switch 163 is grounded; the other end of the non-locked power switch 163 is connected to one end of the discharging-side resistor 118 and one end of the capacitor 104; the other end of the capacitor 104 is connected to an anode of the discharging-side diode 116 and a cathode of the connection-side diode 126; the power supply apparatus 20 is connected to a first end of the connection-side transistor switch 120, one end of the connection-side first resistor 122, one end of the connection-side third resistor 128, a cathode of the discharging-side diode 116 and the other end of the discharging-side resistor 118; a second end of the connection-side transistor switch 120 is connected to the power converter 108; a third end of the connection-side transistor switch 120 is connected to one end of the connection-side second resistor 124, the other end of the connection-side first resistor 122 and the other end of the connection-side third resistor 128; the other end of the connection-side second resistor 124 is connected to an anode of the connection-side diode 126 and an anode of the control-side diode 134; a cathode of the control-side diode 134 is connected to a first end of the control-side transistor switch 132; a second end of the control-side transistor switch 132 is grounded; a third end of the control-side transistor switch 132 is connected to the microcontroller 130.

Figure 2:
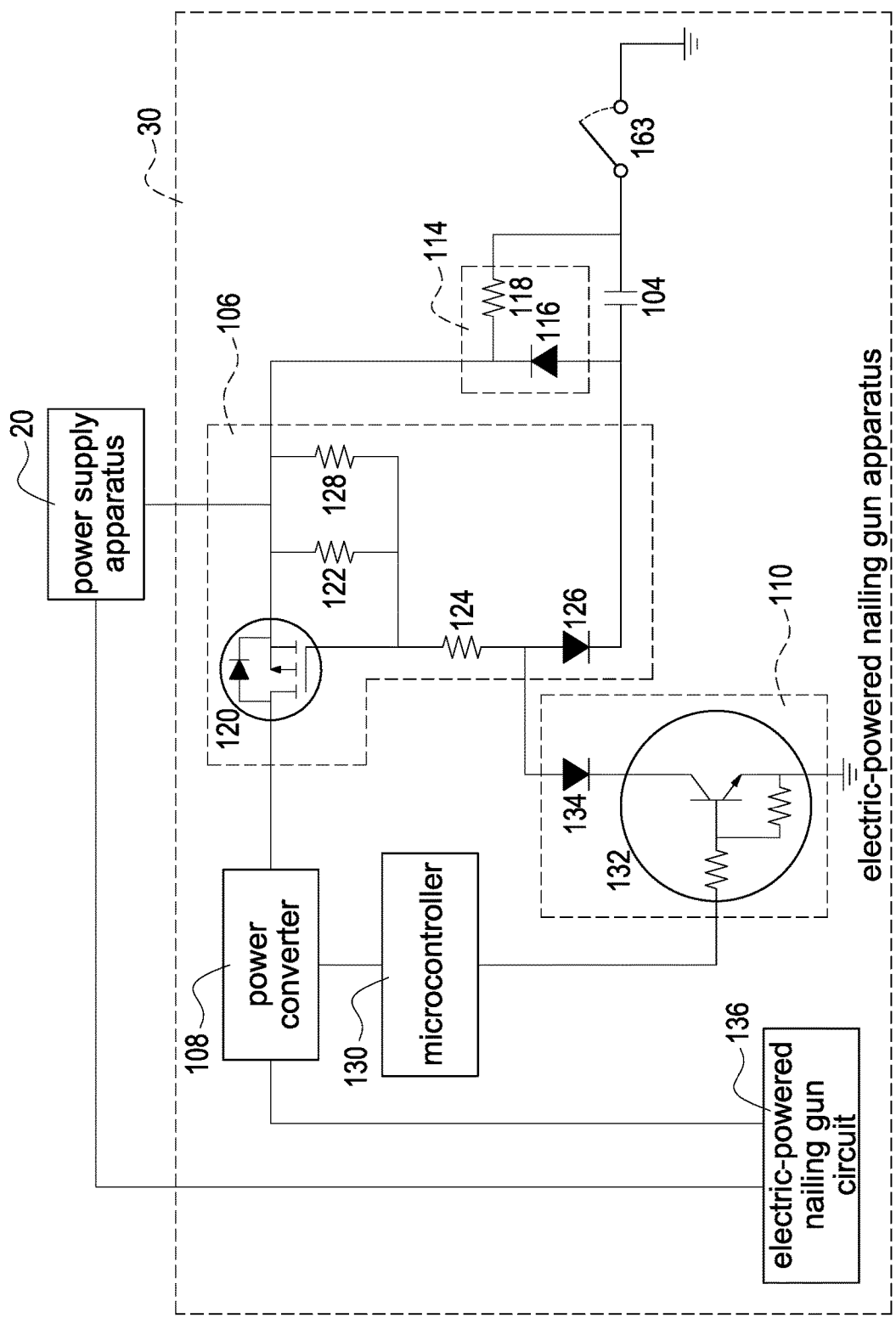
FIG. 2 shows a circuit block diagram of the electric-powered nailing gun apparatus of the present disclosure.

FIG. 2 shows a circuit block diagram of the electric-powered nailing gun apparatus 30 of the present disclosure. The descriptions of the elements shown in FIG. 2 which are the same as the elements shown in FIG. 1 are not repeated here for brevity. The difference between FIG. 2 and FIG. 1 is that the electric-powered nailing gun apparatus 30 of FIG. 2 includes all the components of the power control circuit 10 of FIG. 1, and the electric-powered nailing gun apparatus 30 of FIG. 2 further includes an electric-powered nailing gun circuit 136 which is electrically connected to the power converter 108 and which is used to replace the electronic circuit 40 of FIG. 1.

Figures 1, 3:
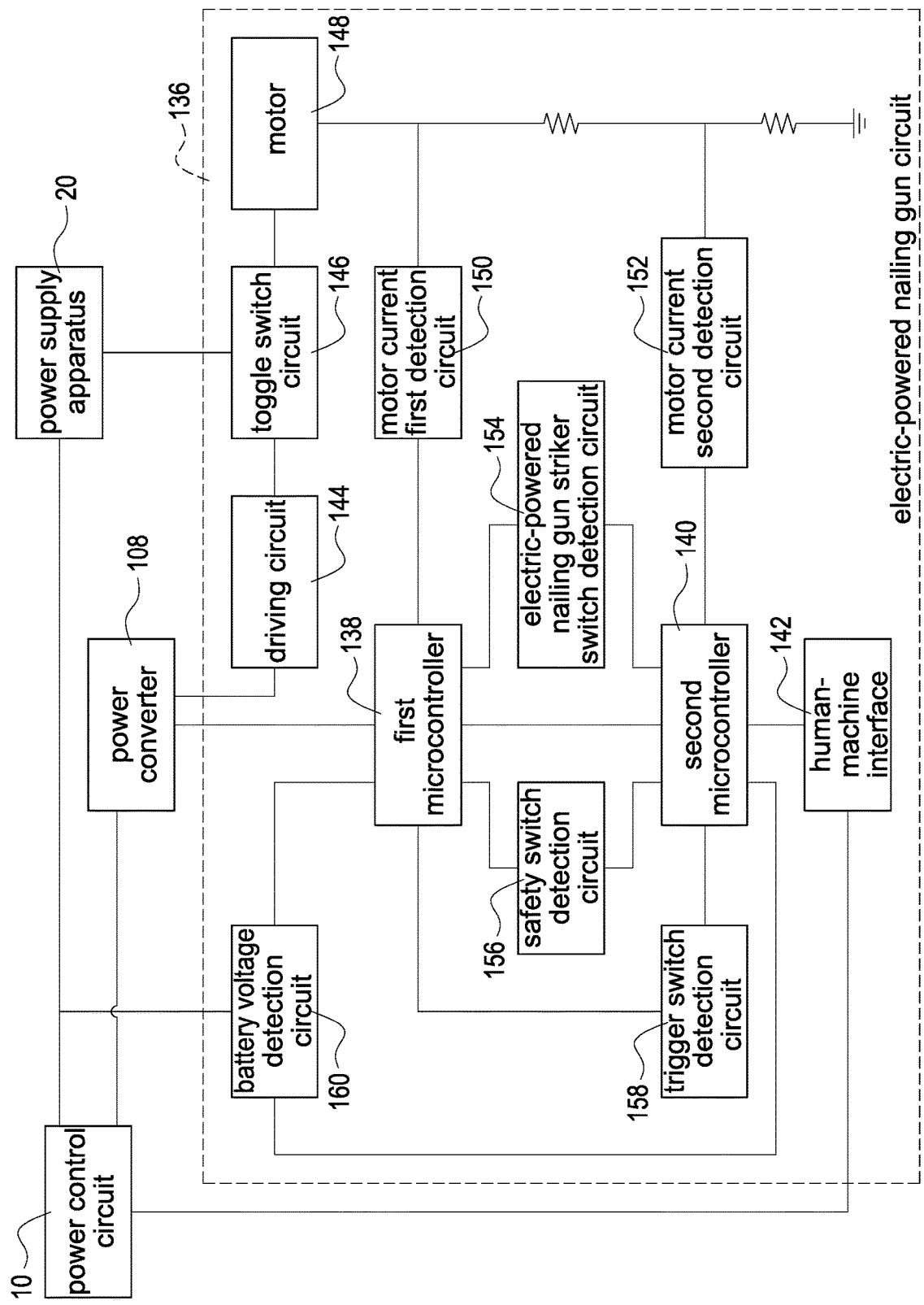
Figures 2, 3:
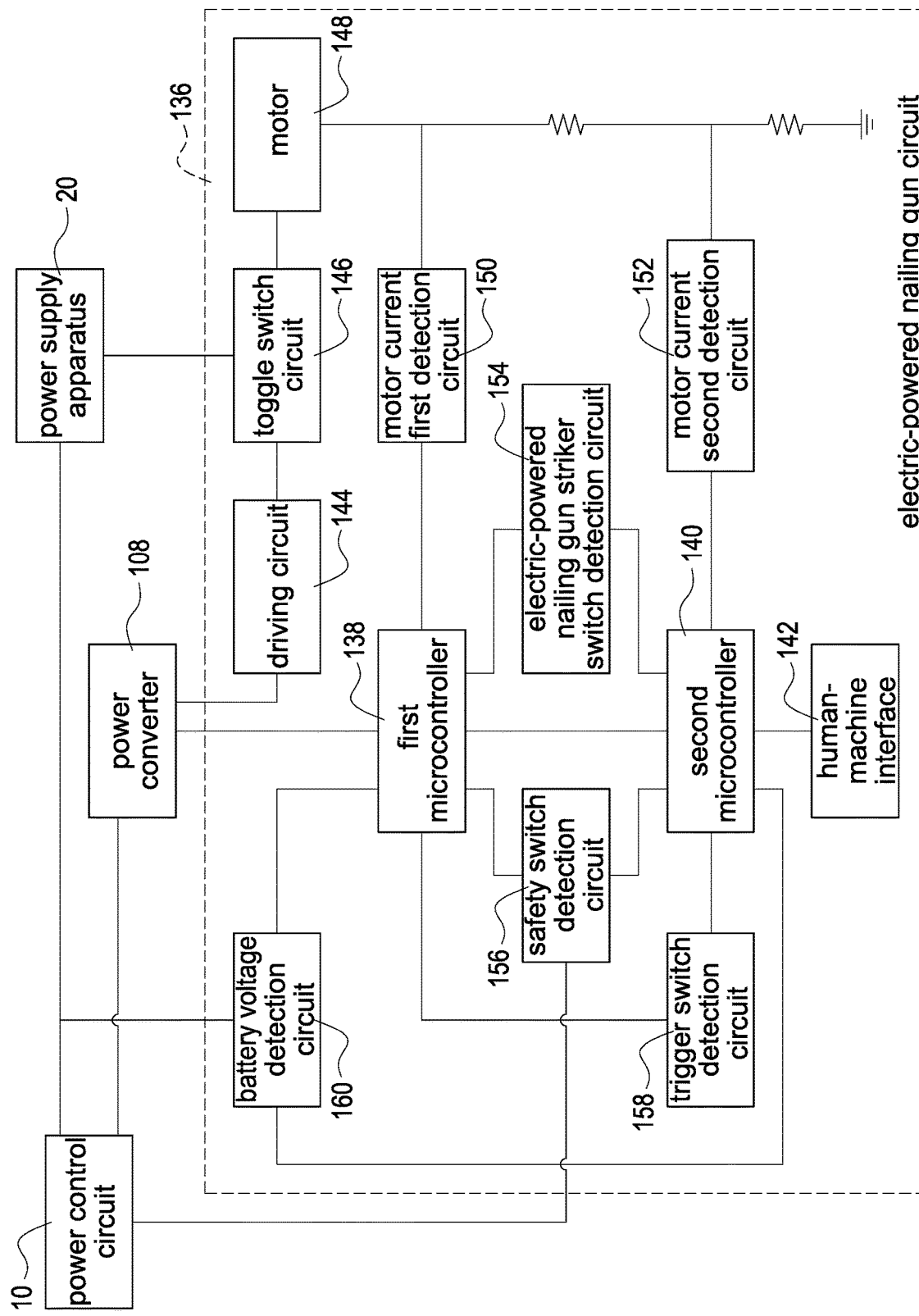

Moreover, FIG. 3-1 shows a block diagram of the first embodiment of the electric-powered nailing gun circuit 136 of FIG. 2 of the present disclosure. The electric-powered nailing gun circuit 136 includes a first microcontroller 138, a second microcontroller 140, a human-machine interface 142, a driving circuit 144, a toggle switch circuit 146, a motor 148, a motor current first detection circuit 150, a motor current second detection circuit 152, an electric-powered nailing gun striker switch detection circuit 154, a safety switch detection circuit 156, a trigger switch detection circuit 158 and a battery voltage detection circuit 160. The first microcontroller 138 is electrically connected to the power converter 108; the second microcontroller 140 is electrically connected to the first microcontroller 138; the human-machine interface 142 is electrically connected to the second microcontroller 140 and the power converter 108; the driving circuit 144 is electrically connected to the power converter 108; the toggle switch circuit 146 is electrically connected to the driving circuit 144 and the power supply device 20; the motor 148 is electrically connected to the toggle switch circuit 146; the motor current first detection circuit 150 is electrically connected to the first microcontroller 138 and the motor 148; the motor current second detection circuit 152 is electrically connected to the second microcontroller 140, the motor 148 and the motor current first detection circuit 150; the electric-powered nailing gun striker switch detection circuit 154 is electrically connected to the first microcontroller 138 and the second microcontroller 140; the safety switch detection circuit 156 is electrically connected to the first microcontroller 138 and the second microcontroller 140; the trigger switch detection circuit 158 is electrically connected to the first microcontroller 138 and the second microcontroller 140; the battery voltage detection circuit 160 is electrically connected to the first microcontroller 138, the second microcontroller 140 and the power supply device 20. In the embodiment of FIG. 3-1, the non-locked power switch 163 (as shown in FIG. 1 and FIG. 2) of the power control circuit 10 (the electric-powered nailing gun apparatus 30) is integrated into the human-machine interface 142; namely, the human-machine interface 142 may be one kind of the non-locked power switch 163, and is operated by the user, and is electrically connected to the power control circuit 10.

Moreover, FIG. 3-2 shows a block diagram of the second embodiment of the electric-powered nailing gun circuit 136 of FIG. 2 of the present disclosure. The descriptions of the elements shown in FIG. 3-2 which are the same as the elements shown in FIG. 3-1 are not repeated here for brevity. In the embodiment of FIG. 3-2, the non-locked power switch 163 (as shown in FIG. 1 and FIG. 2) of the power control circuit 10 (the electric-powered nailing gun apparatus 30) is integrated into a safety switch 164 as shown in FIG. 4; namely, the safety switch 164 is actuated by a safety apparatus 166 as shown in FIG. 4; the safety switch 164 may also be one kind of the non-locked power switch 163; after the safety switch 164 is electrically connected to the safety switch detection circuit 156 of FIG. 3, then the safety switch 164 is electrically connected to the power control circuit 10 (the power converter 108).

Figure 4:
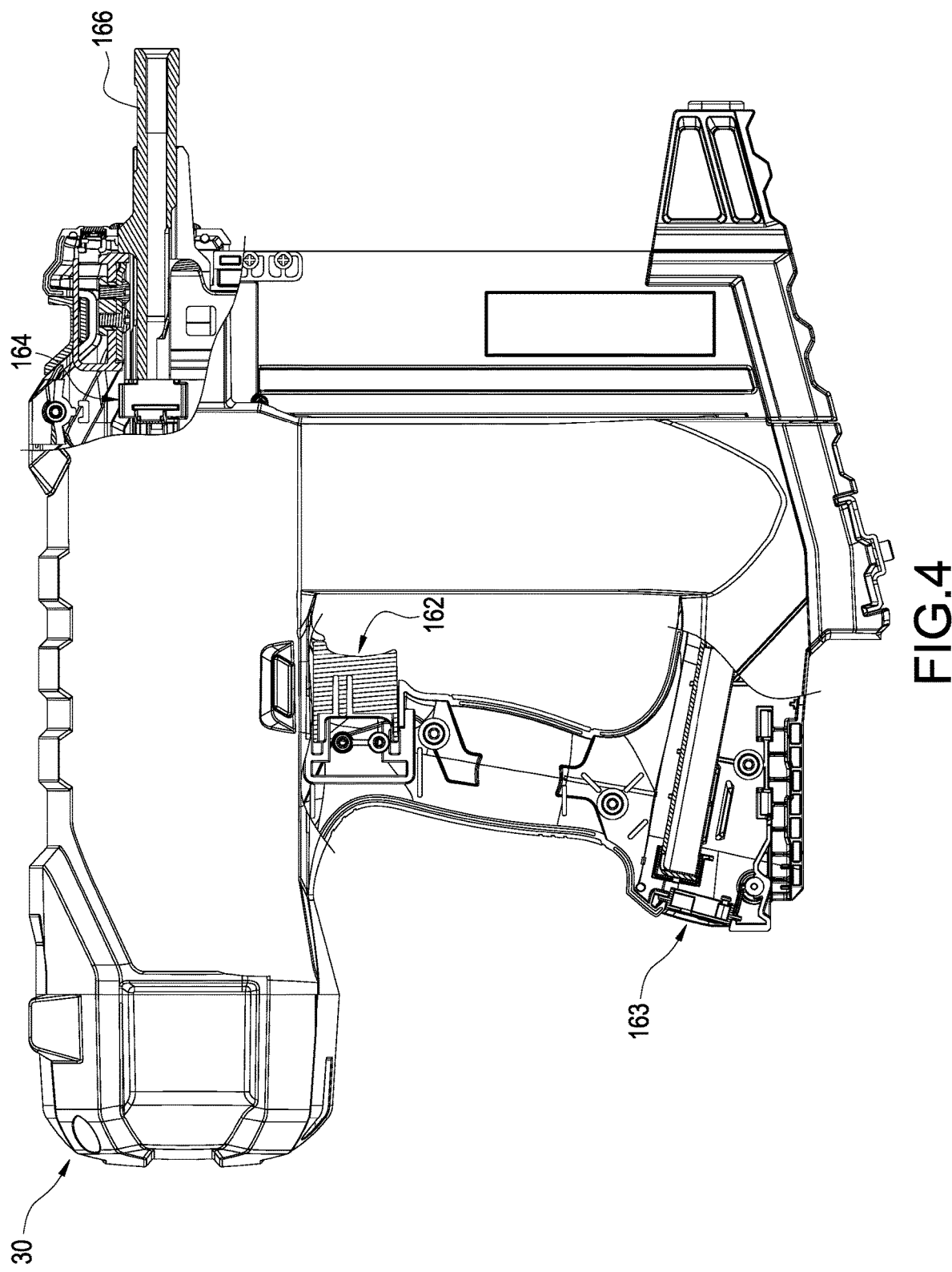
FIG. 4 shows a perspective view of the electric-powered nailing gun apparatus of FIG. 2 of the present disclosure.

Moreover, FIG. 4 shows a perspective view of the electric-powered nailing gun apparatus 30 of FIG. 2 of the present disclosure. The electric-powered nailing gun apparatus 30 further includes a trigger switch 162, the safety switch 164 and the safety apparatus 166. The trigger switch 162 is electrically connected to the trigger switch detection circuit 158 of FIG. 3. The safety switch 164 is actuated by the safety apparatus 166 and is electrically connected to the safety switch detection circuit 156 of FIG. 3.

The advantage of the present disclosure is to prevent the power control circuit or the electric-powered nailing gun apparatus from being unable to sleep due to the continuous grounding of the non-locked power switch (for example, the abnormal jamming or failure) and wasting power.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A power control circuit applied to a power supply apparatus, the power control circuit comprising:
    a non-locked power switch;
    a capacitor electrically connected to the non-locked power switch;
    a power connection unit electrically connected to the capacitor;
    a power converter electrically connected to the power connection unit; and
    a self-hold control unit electrically connected to the power converter and the power connection unit,
    wherein when the non-locked power switch is grounded, the capacitor is fully charged, and the self-hold control unit is controlled to be turned off, the capacitor is configured to stop being charged by the power supply apparatus through the power connection unit and the power control circuit is configured to enter a sleep mode.

2. The power control circuit of claim 1, further comprising:
    a discharging unit electrically connected to the non-locked power switch, the capacitor and the power connection unit.

3. The power control circuit of claim 2, wherein the discharging unit comprises:
    a discharging-side diode electrically connected to the power connection unit and the capacitor; and
    a discharging-side resistor electrically connected to the non-locked power switch, the capacitor, the discharging-side diode and the power connection unit.

4. The power control circuit of claim 3, wherein the power connection unit comprises:
    a connection-side transistor switch electrically connected to the power converter;
    a connection-side first resistor electrically connected to the connection-side transistor switch;
    a connection-side second resistor electrically connected to the connection-side transistor switch and the connection-side first resistor;
    a connection-side diode electrically connected to the connection-side second resistor and the capacitor; and
    a connection-side third resistor electrically connected to the connection-side transistor switch, the connection-side first resistor and the connection-side second resistor.

5. The power control circuit of claim 4, further comprising:
    a microcontroller electrically connected to the power converter,
    wherein the self-hold control unit comprises:
    a control-side transistor switch electrically connected to the microcontroller; and
    a control-side diode electrically connected to the control-side transistor switch and the power connection unit.

6. An electric-powered nailing gun apparatus applied to a power supply apparatus, the electric-powered nailing gun apparatus comprising:
    a non-locked power switch;
    a capacitor electrically connected to the non-locked power switch;
    a power connection unit electrically connected to the capacitor;
    a power converter electrically connected to the power connection unit;
    a self-hold control unit electrically connected to the power converter and the power connection unit; and
    an electric-powered nailing gun circuit electrically connected to the power converter,
    wherein when the non-locked power switch is grounded, and the capacitor is fully charged, and the self-hold control unit is controlled to be turned off, the capacitor is configured to stop being charged by the power supply apparatus through the power connection unit and the electric-powered nailing gun apparatus is configured to enter a sleep mode.

7. The electric-powered nailing gun apparatus of claim 6, further comprising:
    a discharging unit electrically connected to the non-locked power switch, the capacitor and the power connection unit.

8. The electric-powered nailing gun apparatus of claim 7, wherein the discharging unit comprises:
    a discharging-side diode electrically connected to the power connection unit and the capacitor; and
    a discharging-side resistor electrically connected to the non-locked power switch, the capacitor, the discharging-side diode and the power connection unit.

9. The electric-powered nailing gun apparatus of claim 8, wherein the power connection unit comprises:
    a connection-side transistor switch electrically connected to the power converter;
    a connection-side first resistor electrically connected to the connection-side transistor switch;
    a connection-side second resistor electrically connected to the connection-side transistor switch and the connection-side first resistor;
    a connection-side diode electrically connected to the connection-side second resistor and the capacitor; and a connection-side third resistor electrically connected to the connection-side transistor switch, the connection-side first resistor and the connection-side second resistor.

10. The electric-powered nailing gun apparatus of claim 9, further comprising:
a microcontroller electrically connected to the power converter,
wherein the self-hold control unit comprises:
a control-side transistor switch electrically connected to the microcontroller; and
a control-side diode electrically connected to the control-side transistor switch and the power connection unit.

11. The electric-powered nailing gun apparatus of claim 6, wherein the electric-powered nailing gun circuit comprises a human-machine interface electrically connected to the power converter, and wherein the non-locked power switch is integrated into the human-machine interface.

12. The electric-powered nailing gun apparatus of claim 6, further comprising:
a safety switch electrically connected to the power converter,
wherein the non-locked power switch is integrated into the safety switch.

* * * * *